No. 845,899. PATENTED MAR. 5, 1907.
B. J. ROEHM.
COMBINATION CALIPER GAGE.
APPLICATION FILED APR. 30, 1906.
2 SHEETS—SHEET 1.
Fig. 1.
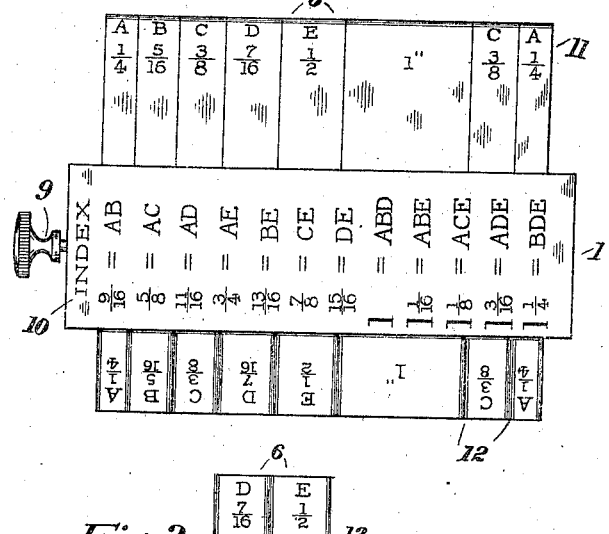
Fig. 2.
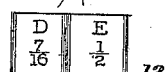
Fig. 3. Fig. 4.
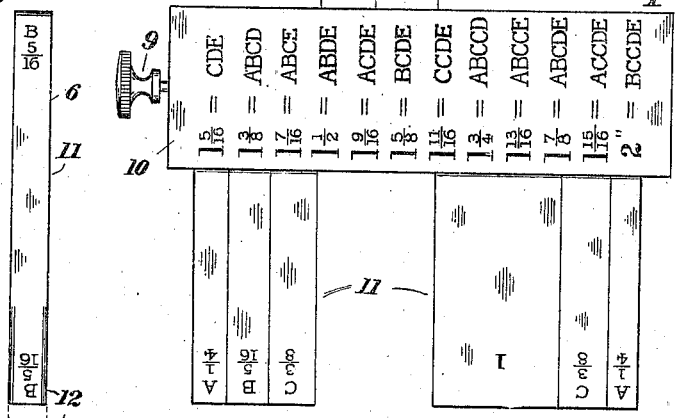
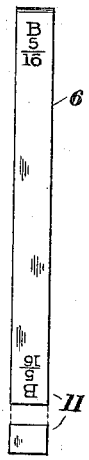
Fig. 5.
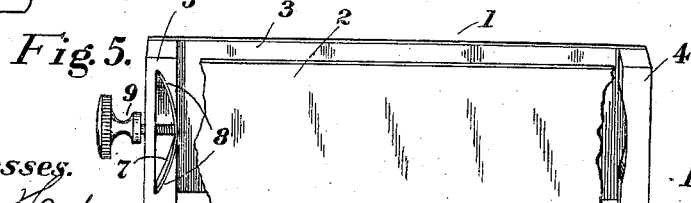
Witnesses.
Harry Henke
M. E. Glass
Inventor.
Bernard J. Roehm
by James N. Ramsey
Attorney.

No. 845,899. PATENTED MAR. 5, 1907.
B. J. ROEHM.
COMBINATION CALIPER GAGE.
APPLICATION FILED APR. 30, 1906.
2 SHEETS—SHEET 2.
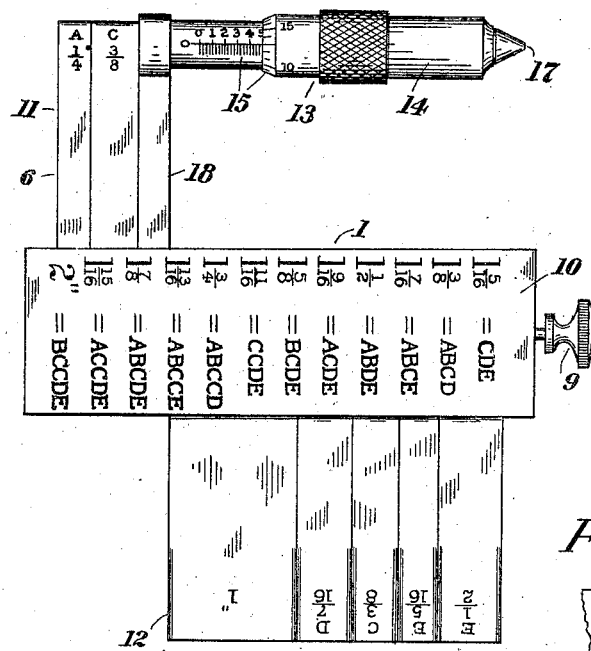
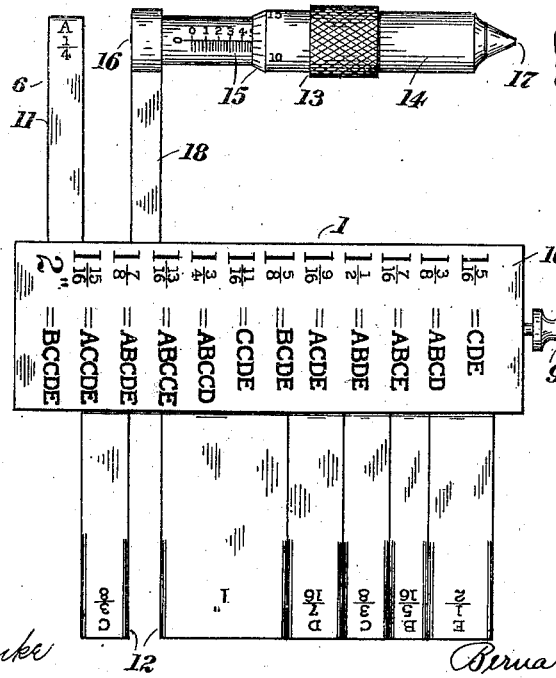

UNITED STATES PATENT OFFICE.

BERNARD J. ROEHM, OF CINCINNATI, OHIO, ASSIGNOR OF ONE-HALF TO JAMES MULLIGAN, OF CINCINNATI, OHIO.

COMBINATION CALIPER-GAGE.

No. 845,899.     Specification of Letters Patent.     Patented March 5, 1907.

Application filed April 30, 1906. Serial No. 314,516.

*To all whom it may concern:*

Be it known that I, BERNARD J. ROEHM, a citizen of the United States, residing at Cincinnati, in the county of Hamilton and State of Ohio, have invented certain new and useful Improvements in Combination Caliper-Gages, of which the following is a specification.

My invention relates to combination-gages for mechanics' use.

The object of my invention is to provide a single instrument which is adapted by varying the combinations of parts composing it to take the place of a large number of round and square external and internal gages, and thereby economize in the size and cost of same.

My invention consists in a gage comprising a slotted case provided with a plurality of gages of varying sizes for measuring external and internal dimensions adapted to be held in place by suitable means or adjusted to different positions therein or removed therefrom, as desired.

My invention also consists in providing means for increasing the variations in measurement by means of a micrometer attachment.

My invention further consists in the parts, construction, combination, and arrangement of parts, as set forth and claimed.

In the drawings which serve to illustrate my invention, Figure 1 is a side elevation of the gage. Fig. 2 is a side elevation of the gage when set for both external and internal measurements. Fig. 3 is a detail view of one of the gages, showing a curved end. Fig. 4 is a similar view of one of the gages having rectangular ends. Fig. 5 is a perspective view of the slotted case, partly broken away to show the interior, including thumb-screw and spring-bearing. Fig. 6 is a side elevation of the gage provided with micrometer attachment set for internal measurements. Fig. 7 is a side view of the gage with micrometer attachment set for both external and internal measurements. Fig. 8 is a sectional view of one end of the instrument, showing the normal position of the spring-bearing, the dotted lines showing its position when the gages are inserted in the case.

I prefer to construct the gage made according to my invention as follows:

A slotted case 1, having sides 2 and 3 and ends 4 and 5, is adapted to receive gages 6 transversely of said sides and be secured therein or released therefrom by a spring-bearing 7, located in a dovetail 8 and by thumb-screw 9 in end 5 of the slotted case. The sides 2 and 3, respectively, are provided with index 10 for designating the different gages to be used in making the various external and internal measurements by use of one or more of the gages, as the case may be—as, for instance, if it is desired to make either a fifteen-sixteenths-inch external or internal measurement refer to the index, Fig. 1, where fifteen-sixteenths inch is shown, and by combining the gages marked "D" and "E," respectively, and adjusting said gages to the positions shown in said Fig. 2 both internal and external measurements can be made. Each gage is preferably provided with a rectangular end 11 and also a curved end 12 to permit measurements of internal circular diameters.

My gage is preferably provided with a micrometer attachment 13, consisting of the barrel 14, graduations 15, calipering-point 16, and calipering-point 17, both mounted upon a stem 18, adapted to take the place of one of the gages 6 and be held in place as shown in Figs. 6 and 7.

The inner surface of end 4 is preferably recessed between its ends to insure the gages in position at right angles to the sides 2 and 3.

I prefer to form one end of each gage 6 with curved ends, as shown in Fig. 3; but each end may be formed curved or rectangular, as desired. When one end of each gage 6 is rectangular and one end curved, both the external and internal gages formed to obtain the desired measurement may have either or both curved or rectangular ends exposed for that purpose.

The spring-bearing 7 is adapted to normally project beyond the inner surface of the end in which the dovetail 8 is formed in order to bear against the adjacent gage, and thereby hold all of the gages in position while setting the gage for making either external or internal measurements.

The gages may be made of such size as to obtain any measurements desired; but for convenience in the actual use of the instrument the sizes represented by the accompanying drawings, which are full size, illustrates a gage adapted to make both external and internal measurements from one-fourth inch to three inches, and by making use of the micrometer attachment the changes in measurement may be varied almost indefinitely from "0" to three inches for external measuremnts and from three inches to six inches for internal measurement.

The manner of using my gage is as follows: Fig. 1 shows the gage in closed position, suitable for carrying in the pocket or in a convenient case. When it is desired to make either an internal or external measurement of a given size, examine the index 10 for the size desired. Then select the gages bearing the letters opposite the size desired and place them adjacent each other in the case—as, for instance, a fifteen-sixteenths-inch gage would be represented by the parts marked "D" and "E," respectively, in Fig. 2 for the internal gage, and upon the other side the external gage would be represented by the space between the parts marked "1" and "C," respectively. If a three-fourths-inch gage is desired, remove either gage "A" from the slotted case 1 and adjust "1" and "C" toward end 4, inserting "A" at the side of "E" and adjusting all of the gages lengthwise in the manner illustrated in Fig. 2. After the slotted case has been filled with the gages they may be held therein in any position desired, as shown in Fig. 1 and Fig. 2, or otherwise by simply turning the thumb-screw against the spring-bearing 7 in the dovetail, thereby causing it to bear against the adjacent gage. To remove or adjust the gage in the case, simply reverse the operation just described. If it is desired to make an external measurement of three inches with the gage, merely shift all of the gages except the outer gages "A" and "A" endwise, leaving only the end gages "A" and "A" projecting from one side of the slotted case. At the same time this will form a three-inch internal gage upon the opposite side. By forming the necessary combinations the various measurements indicated by the index may be made, and when it is desired to make a larger or smaller measurement than thus indicated by the index remove one of the quarter-inch gages "A" and substitute in place thereof the micrometer attachment, which may be adjusted to any measurement desired. For instance, if a few thousandths less than three-eighths inch is desired insert the three-eighths-inch bar next to the micrometer-barrel, as illustrated in Fig. 6, fastening the gages in the case by the thumb-screw 9, next adjust the calipering-point 16 to bear against said three-eighths-inch bar, then release the thumb-screw 9 from the spring-bearing and adjust the three-eighths-inch bar to the position shown in Fig. 7, then retighten the thumb-screw, then turn the micrometer-barrel 14 as many thousandths of an inch less than the three-eighths-inch bar as will make the desired dimensions, and then adjust the instrument to the work.

It will be apparent that my invention is capable of considerable modification without material departure from the scope and spirit thereof.

I claim—

1. In combination caliper-gages, a slotted case having a dovetail in one end, a spring-bearing in said dovetail adapted to normally project beyond the inner surface of said end, a thumb-screw adapted to engage the end of said case and said spring-bearing respectively, and a plurality of gages adapted to be inserted in said slotted case and be held transversely therein by said spring-bearing and thumb-screw respectively.

2. In combination caliper-gages, a slotted case, gages in said case adapted to measure external and internal dimensions, means for holding said gages in said case, an index upon each gage adapted to indicate its dimensions and an index upon said case adapted to indicate the dimensions of the gages in different combinations.

3. In combination caliper-gages, a slotted case, gages in said case adapted to measure external and internal dimensions, means for holding said gages in adjusted positions in said case, an index upon each gage adapted to indicate its dimensions, an index upon said case adapted to indicate the dimensions of gages in different combinations and a micrometer attachment adapted to be held in said slotted case to increase the variations in measurements.

4. In combination caliper-gages, a slotted case, gages in said case adapted to measure external and internal dimensions, means for holding said gages in adjusted position in said case and a micrometer attachment adapted to be held in said case to increase the variations in measurements.

5. In combination caliper-gages, a slotted case having a dovetail in one end, a spring-bearing in said dovetail adapted to normally project beyond the inner surface of said end and a plurality of gages adapted to be inserted in said slotted case and be held transversely therein by said spring-bearing.

BERNARD J. ROEHM.

Witnesses:
JAMES N. RAMSEY,
MARGARET O'CONNOR.